United States Patent [19]

Bubnick

[11] 4,379,815

[45] Apr. 12, 1983

[54] CELL HAVING MIXED SOLID CATHODE MATERIALS FOR CONTROLLING CELL EXPANSION ON DISCHARGE

[75] Inventor: Gerald F. Bubnick, Avon Lake, Ohio

[73] Assignee: Union Carbide Corporation, Danbury, Conn.

[21] Appl. No.: 278,903

[22] Filed: Jun. 29, 1981

[51] Int. Cl.³ .......................... H01M 4/52; H01M 4/58
[52] U.S. Cl. ..................................... 429/66; 429/220; 429/221
[58] Field of Search .................. 429/66, 218, 220, 221

[56] References Cited

U.S. PATENT DOCUMENTS 4,129,686 12/1978 Kaduboski ............................ 429/66

FOREIGN PATENT DOCUMENTS 54-75534  6/1979 Japan .
55-50576  4/1980 Japan .
55-111068 8/1980 Japan .
55-154070 12/1980 Japan .................................. 429/220
55-154072 12/1980 Japan .
55-165581 12/1980 Japan .
56-18369  2/1981 Japan .................................. 429/221

*Primary Examiner*—Donald L. Walton
*Attorney, Agent, or Firm*—Cornelius F. O'Brien

[57] ABSTRACT

A galvanic cell employing a consumable anode such as lithium, a cathode that expands during cell discharge and an electrolyte, wherein the improvement is that the cathode is composed of a physical mixture of at least two solid active materials having different expansion characteristics on cell discharge and selected such that the cathode mixture has a volumetric expansion substantially equal to the volumetric contraction of the anode thereby providing a cell that will have a substantially constant physical configuration during discharge.

7 Claims, No Drawings

4,379,815

CELL HAVING MIXED SOLID CATHODE MATERIALS FOR CONTROLLING CELL EXPANSION ON DISCHARGE

FIELD OF THE INVENTION

This invention relates to galvanic cells and specifically to such cells in which the cathode expands and the anode contracts during cell discharge and wherein the cathode is composed of at least two solid active materials having different expansion characteristics on cell discharge and selected such that the mixture of active cathode materials has a volumetric expansion during discharge substantially equal to the volumetric contraction of the anode during discharge thereby effectively and substantially preventing distortion in the housing for the cell.

BACKGROUND OF THE INVENTION

The battery has become a primary power source for many portable electronic devices such as radios, hearing aids, watches, calculators, and the like. In order to maintain the overall electronic devices as compact as possible, the electronic devices are usually designed with cavities to accommodate miniature batteries as their source of power. The cavities are usually made so that a battery can be snugly positioned therein thus making electronic contact with appropriate terminals within the device. A major potential problem in the use of battery powered devices of this nature is that if the battery bulges, it usually becomes wedged within the cavity of the device which sometimes can result in damage to the device. One cause of cell bulging or other distortion of the cell's overall physical dimensions is due to the expansion of the cathode during discharge or during abusive discharge conditions. For example, in nonaqueous lithium/solid cathode systems, the cathode may expand and move into the anode compartment of the cell during discharge. Especially with improperly balanced cell components or under abusive cell conditions, it is common for this cathode expansion to cause cell distortion (bulging) which, in turn, may cause damage to the electronic device in which the cell is used. Since this type of cell distortion is due to the physical expansion of the cathode, then a possible solution to minimize any overall cell distortion is to provide a void or cavity within the cell to accommodate the expansion of the cathode. Within electronic technology geared to miniaturization, it becomes necessary to package the power supply in a miniature type package so that the device it is to power can be reduced in size. Consequently, providing cavities within the cell system to accommodate any electrode expansion is not economically feasible.

Another disadvantage of excessive cathode expansion is that the increase in force of the cathode against the anode via the separator could alter the resistive characteristics of the cell resulting in undesirably low energy output during certain cell applications. For example, it has been observed that in a $FeS_2$/lithium cell, excessive expansion of $FeS_2$ occurs that causes the cell to bulge and also results in low service and/or premature reduction in the cell's pulsing capability during discharge. In a like manner, insufficient expansion of the cathode would not provide a continuous optimum contact between the cathode and anode which could also result in changing the resistive characteristics of the cell.

It is, therefore, an important object of this invention to provide a compact cell assembly which employs a mixture of solid active cathodic materials that will volumetrically expand during cell discharge to a degree substantially equal to the volumetric contraction of the anode during discharge thereby providing a substantially constant volume cell.

Another object of the present invention is to provide a cell that will not excessively bulge in a device during its useful discharge period.

Another object of the present invention is to provide a cell having a cathode comprising a physical mixture of CuO and $FeS_2$ in conjunction with a lithium anode and a suitable electrolyte that overall remains substantially volumetrically constant during discharge.

Another object of the present invention is to provide a cell having a cathode comprising a physical mixture of $Bi_2O_3$ and $FeS_2$ in conjunction with a lithium anode and a suitable electrolyte that overall remains substantially volumetrically constant during discharge.

The foregoing and additional objects will become more fully apparent from the following description.

SUMMARY OF THE INVENTION

The invention relates to a cell comprising a consumable anode, a cathode that expands during cell discharge, and an electrolyte, the improvement wherein the cathode comprises a physical mixture of at least two solid active cathode materials in which a first solid active cathode material volumetrically expands more than the volumetric contraction of the anode during cell discharge and a second solid active cathode material that volumetrically expands less than the volumetric expansion of the first solid active cathode material during cell discharge and wherein said solid active cathode materials are selected such that the volumetric expansion of the mixture of the solid active cathode materials is substantially equal to the volumetric contraction of the anode during cell discharge thereby providing a substantially constant volume for the cathode/anode assembly during discharge of the cell. Preferably, the second active cathode material should volumetrically expand less than the volumetric contraction of the anode.

As used herein, the term "consumable anode" shall mean an electrode that is electrochemically oxidized during cell discharge, thereby resulting in a charge in its contour, for example, a shrinkage or reduction in thickness or volume.

As used herein, the term "cathode" shall mean an electrode that is electrochemically reduced and increases in volume during discharge.

Preferably the selection of the active cathode materials should be such that the operating voltage of each cathode material with respect to the anode of the cell will be within 0.3 volt of each other. This will insure a substantially unipotential voltage output in most cell applications. If the disparity in the voltage output of the active cathode materials is too great, then a possible dual voltage output would result that would severely restrict the commercial use of the cell. More preferably, the solid active cathode materials should discharge simultaneously.

Proper selection of the active cathode materials so that the overall volumetric expansion of the cathode substantially matches the volumetric contraction of the anode during discharge will substantially eliminate distortion of the cell's housing thereby preventing possible damage to the device in which it is employed. In addition, by substantially eliminating distortion of the cell's housing due to the expansion of the cathode, the seal of the cell can be effectively maintained during the useful life of the cell. Of equal or primary importance in maintaining substantial constant volume of the cell components during discharge is that the interfacial surface areas of the anode/separator and separator/cathode will be maintained to insure good electronic contact to enable the cell to perform efficiently.

The present invention can be easily implemented by first discharging cells each of which contains only one of the active cathode materials and then monitoring the discharge performance and overall physical appearance of each cell. Thereafter, the active cathode material in the cell showing poor electrochemical performance and cell bulging can be physically mixed with an active cathode material observed in a cell that did not show excessive bulging. The physical mixture of the two active cathode materials can then be assembled in a cell in a conventional manner followed by discharging the cell. The results will easily show the optimum mixture that should be employed to effectively prevent distortion in the housing of the cell.

In $FeS_2$/Li cell systems, it has been observed that during discharge, particularly on low drains (150 Kohm load for a 120 milliampere-hour capacity), the cathode expands excessively to a degree that distorts the cell's housing and decreases or prematurely reduces the cell's pulsing capabilities during discharge. Pulse capability means the ability of the cell to repeatedly sustain a relatively high current drain for short periods of time at an acceptable voltage. By adding CuO, which volumetrically expands during discharge less than $FeS_2$, a mixture of CuO and $FeS_2$ is obtained which can be employed in a lithium cell and which will expand less than the expansion of $FeS_2$ used alone as the cathode under the same discharge conditions. The CuO has to be added in an amount between about 35% to about 75% by weight of the mixture of active cathode materials and preferably between about 45% and about 55% by weight of the mixture of active cathode materials.

Another cell system for use in this invention employs a mixture of $Bi_2O_3$ and $FeS_2$ along with a lithium anode. Preferably, the $Bi_2O_3$ should be added in an amount between about 10% to about 75% by weight of the active cathode materials and more preferably between about 40% and 60% by weight of the active cathode materials. Using a cathode mixture of $Bi_2O_3$ and $FeS_2$ in an amount recited above along with a lithium anode and an electrolyte solution will provide a cell having an overall substantially constant volume during the useful discharge life of the cell.

In nonaqueous cell systems suitable active cathode materials would include $CF_x$ where x varies from above 0 to 1.1, $C_2F$, metal oxides such as $V_2O_5$, $WO_3$, $Pb_2Bi_2O_5$, $MoO_3$, $Bi_2O_3$, lead oxides (e.g., $Pb_3O_4$ and PbO), cobalt oxides, $MnO_2$, copper oxides (e.g., CuO), etc., metal sulfides such as CuS, $CoS_2$, $In_2S_3$, FeS, $FeS_2$, NiS, metal chromates such as $Ag_2CrO_4$, metal halides such as $PbF_2$, metal phosphates such as $Ag_3PO_4$, and metal sulfates such as $CuSO_4$. The particular selection of at least two active cathode materials will depend on their expansion characteristics with reference to the selected anode so that the overall physical mixture will volumetrically expand substantially equal to the contraction of the anode. Some suitable combinations would be:

$FeS_2 + CuO$
$FeS_2 + Bi_2O_3$
$FeS_2 + Pb_2Bi_2O_5$
$FeS_2 + Pb_3O_4$
$FeS_2 + CuO + Bi_2O_3$
$FeS + CuO + Pb_3O_4$
$FeS_2 + CuO + CoS_2$
$FeS_2 + CoS_2$
$FeS_2 + CuO + Pb_3O_4$

Highly active negative electrodes for use in nonaqueous systems according to this invention would be consumable metals and include aluminum, the alkali metals, alkaline earth metals and alloys of alkali metals or alkaline earth metals with each other and other metals. The term "alloys" as used herein and in the appended claims is intended to include mixtures, solid solutions such as lithium-magnesium, and intermetallic compounds such as lithium monoaluminide. The preferred negative materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable negative electrodes.

Preferred solvents for use with nonaqueous cells are sulfolane; crotonitrile; nitrobenzene; tetrahydrofuran; 1,3-dioxolane; 3-methyl-2-oxazolidone; propylene and ethylene carbonate; γ-butyrolactone; ethylene glycol sulfite; dimethylsulfite; dimethyl sulfoxide; and 1,1- and 1,2-dimethoxyethane. Of the preferred solvents, the best are 3-methyl-2-oxazolidone; propylene and ethylene carbonate, 1,2-dimethoxyethane and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., $LiCF_3SO_3$ or $LiClO_4$, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293-313 by G. N. Lewis).

A separator for use in this invention has to be chemically inert and insoluble in the cell system and have a porosity so as to permit the liquid electrolyte to permeate through and contact the negative electrode of the cell, thus establishing an ion transfer path between the negative and positive electrodes.

The two-part container housing for the cell could be made of stainless steel, iron, nickel, nickel-plated steel, or some other conductive material that will not corrode or otherwise deteriorate when in contact with the cell materials.

The insulating member disposed between the cover and the can has to be stable in the presence of the cell components and can be selected from such materials as polytetrafluoroethylene, fluorinated ethylene-propylene polymer, ethylene copolymer with fluorinated ethylene-propylene, polychlorotrifluoroethylene, perfluoro-alkoxy polymer, polyvinyl, polyethylene, polypropylene, polystyrene, nylon, etc.

EXAMPLE

Several miniature button cells, 0.455 inch diameter and about 0.165 inch height (1.13 cm diameter and about 0.40 cm height), were produced using a lithium anode disc, a bonded cathode mix containing CuO, $FeS_2$ or mixtures thereof as shown in Tables 1 and 2 and a nonaqueous electrolyte consisting of a mixture of 30 volume percent dimethoxyethane (DME), 30 volume percent 3-methyl-2-oxazolidone ($3Me_2Ox$) and 40 volume percent 1,3-dioxolane containing 1 M $LiCF_3SO_3$ as the solute. These components were assembled, along with a separator between the anode and cathode mix, into a container sealed at its top by a cover. A nylon gasket was disposed between the interface of the cover and the container to electronically insulate the cover from the container.

TABLE 1

| Component | Sample A 100/0 Wt. % | Sample A 100/0 Vol. % | Sample B 75/25 Wt. % | Sample B 75/25 Vol. % | Sample C 50/50 Wt. % | Sample C 50/50 Vol. % | Sample D 25/75 Wt. % | Sample D 25/75 Vol. % | Sample D 0/100 Wt. % | Sample D 0/100 Vol. % |
|---|---|---|---|---|---|---|---|---|---|---|
| CuO | 90 | 75.45 | 67.5 | 53.23 | 45 | 33.51 | 22.5 | 15.87 | 0 | 0 |
| $FeS_2$ | 0 | 0 | 22.5 | 23.66 | 45 | 44.68 | 67.5 | 63.47 | 90 | 80.38 |
| Acetylene Black | 5 | 14.04 | 5 | 13.21 | 5 | 12.48 | 5 | 11.81 | 5 | 11.22 |
| *Teflon | 4 | 9.75 | 4 | 9.18 | 4 | 8.66 | 4 | 8.21 | 4 | 7.79 |
| Zinc | 1 | 0.75 | 1 | 0.71 | 1 | 0.67 | 1 | 0.63 | 1 | 0.60 |

Wt. % and Vol. % are based on total weight and volume, respectively, of the cathode mix.
*polytetrafluoroethylene

TABLE 2

|  | Sample A | Sample B | Sample C | Sample D | Sample E |
|---|---|---|---|---|---|
| Mix density (gms/cc) | 5.365 | 5.048 | 4.766 | 4.514 | 4.287 |
| Cathode wt. (average) | 0.2696 | 0.2670 | 0.2495 | 0.2647 | 0.2230 |
| Cathode density (g/in$^3$) | 40.35 | 39.97 | 37.34 | 39.62 | 33.38 |
| % Packing | 45.90 | 48.31 | 47.82 | 53.56 | 47.51 |
| % Porosity | 54.10 | 51.68 | 52.18 | 46.43 | 52.48 |
| Cathode input (mAh) | 163.5 | 175.1 | 176.0 | 199.8 | 179.3 |

Cells from each of the sample cell lots were discharged across a 15 Kohm load at 21° C. The milliampere hour output (mAh), the energy density (Wh/in$^3$) and change in the physical height of each cell in the sample cell lots were observed and the data so obtained are shown in Table 3. Cells from each of the sample cell lots were discharged across a 150 Kohm load at 35° C. The milliampere hour output (mAh), the energy density (Wh/in$^3$) and change in the physical height of each cell in the sample cell lots were observed and the data so obtained are shown in Table 4. As evident from the data shown in Tables 3 and 4, the bulge in the cells containing CuO was smaller than the bulge in the cells employing only $FeS_2$. In addition, the average milliampere-hour output on a 150 Kohm drain was higher for a cell using a 50—50 mixture of CuO and $FeS_2$ than for the cells using either CuO or $FeS_2$ alone as the cathode.

TABLE 3

| Sample Cell Lot | Cell | to 1.2V mAh | to 1.2V AV | to 1.2V Wh/in$^3$ | *Ht. on Discharge (mils) After | *Ht. on Discharge (mils) Before | *Ht. on Discharge (mils) Bulge |
|---|---|---|---|---|---|---|---|
| A | 1 | 93.1 | 1.42 | 4.93 | 162 | 161 | 1 |
|  | 2 | 115.9 | 1.41 | 6.09 | 166 | 160 | 6** |
|  | 3 | 112.0 | 1.40 | 5.84 | 155 | 155 | 0 |
|  | 4 | 112.0 | 1.40 | 5.84 | 161 | 161 | 0 |
|  | 5 | 94.7 | 1.41 | 4.98 | 155 | 153 | 2 |
|  | Average | 105.5 | 1.41 | 5.54 | 160 | 158 | 1 |
| B | 1 | 84.3 | 1.43 | 4.49 | 152 | 150 | 2 |
|  | 2 | 102.9 | 1.43 | 5.49 | 157 | 158 | −1 |
|  | 3 | 122.2 | 1.41 | 6.42 | 161 | 161 | 0 |
|  | 4 | 115.1 | 1.42 | 6.09 | 156 | 158 | −2 |
|  | 5 | 119.8 | 1.41 | 6.29 | 164 | 162 | 2 |
|  | Average | 108.9 | 1.42 | 5.76 | 158 | 158 | 1 |
| C | 1 | 115.0 | 1.40 | 6.00 | 162 | 161 | 1 |
|  | 2 | 126.0 | 1.40 | 6.57 | 162 | 163 | −1 |
|  | 3 | 104.3 | 1.41 | 5.48 | 155 | 154 | 1 |
|  | Average | 115.1 | 1.40 | 6.01 | 160 | 159 | 1 |
| D | 1 | 123.0 | 1.43 | 6.55 | 165 | 160 | 5 |
|  | 2 | 129.5 | 1.42 | 6.85 | 160 | 157 | 3 |
|  | 3 | 126.9 | 1.43 | 6.76 | 168 | 162 | 6 |
|  | Average | 126.5 | 1.43 | 6.72 | 165 | 160 | 5 |
| E | 1 | 127.2 | 1.43 | 6.78 | 158 | 155 | 3 |
|  | 2 | 98.6 | 1.45 | 5.33 | 152 | 145 | 7 |
|  | 3 | 119.2 | 1.44 | 6.40 | 159 | 154 | 5 |
|  | Average | 115.0 | 1.44 | 6.17 | 156 | 151 | 5 | mAh = milliampere hour output
Av = average voltage
Wh/in$^3$ = watt hours per cubic inch
*Bulge measured after discharge of cells to 0.9 volt
**These results are questionable and possibly could be due to improper cell assembly.

TABLE 4

| Sample Cell Lot | Cell | to 1.2V mAh | to 1.2V AV | to 1.2V Wh/in$^3$ | *Ht. on Discharge (mils) After | *Ht. on Discharge (mils) Before | *Ht. on Discharge (mils) Bulge |
|---|---|---|---|---|---|---|---|
| A | 1 | 119.2 | 1.54 | 6.84 | 160 | 159 | 1 |
|  | 2 | 116.0 | 1.54 | 6.66 | 161 | 160 | 1 |
|  | 3 | 118.5 | 1.54 | 6.80 | 162 | 159 | 3 |
|  | Average | 117.9 | 1.54 | 6.77 | 161 | 159 | 2 |
| B | 1 | 121.6 | 1.57 | 7.11 | 163 | 158 | 5 |
|  | 2 | 129.4 | 1.57 | 7.57 | 168 | 162 | 6 |
|  | 3 | 131.0 | 1.56 | 7.62 | 169 | 165 | 4 |
|  | Average | 127.3 | 1.57 | 7.43 | 167 | 162 | 5 |
| C | 1 | 120.8 | 1.58 | 7.11 | 171 | 165 | 6 |
|  | 2 | 122.3 | 1.58 | 7.20 | 168 | 161 | 7 |
|  | 3 | 133.0 | 1.57 | 7.78 | 170 | 164 | 6 |
|  | Average | 125.3 | 1.58 | 7.36 | 169 | 163 | 6 |
| D | 1 | 120.4 | 1.64 | 7.36 | 173 | 163 | 10 |
|  | 2 | 111.7 | 1.64 | 6.83 | 164 | 157 | 7 |
|  | 3 | 120.4 | 1.64 | 7.36 | 171 | 163 | 8 |

TABLE 4-continued

| Sample Cell Lot | Cell | to 1.2V | | | *Ht. on Discharge (mils) | | |
|---|---|---|---|---|---|---|---|
| | | mAh | AV | Wh/in³ | After | Before | Bulge |
| E | Average | 117.5 | 1.64 | 7.18 | 167 | 159 | 8 |
| | 1 | 120.7 | 1.64 | 7.38 | 163 | 156 | 7 |
| | 2 | 117.8 | 1.64 | 7.20 | 170 | 160 | 10 |
| | 3 | 121.7 | 1.64 | 7.44 | 165 | 156 | 9 |
| | Average | 120.0 | 1.64 | 7.34 | 166 | 157 | 9 | mAh = milliampere hour output
AV = average voltage
Wh/in³ = watt hours per cubic inch
*Bulge measured after discharge of cells to 0.9 volt.

What is claimed is:

1. A cell comprising a consumable anode, a cathode that expands during cell discharge, and an electrolyte, the improvement wherein the cathode comprises a physical mixture of at least two solid active cathode materials in which a first solid active cathode material volumetrically expands more than the volumetric contraction of the anode during cell discharge and a second solid cathode material that volumetrically expands less than the volumetric expansion of the first solid active cathode material during cell discharge and wherein said solid active cathode materials are selected such that the volumetric expansion of the mixture of the solid active cathode materials is substantially equal to the volumetric contraction of the anode during cell discharge thereby providing a substantially constant volume for the cathode/anode assembly during discharge of the cell.

2. The cell of claim 1 wherein the second active cathode material has a volumetric expansion less than the volumetric contraction of the anode.

3. The cell of claim 1 wherein the operating voltage of each of the active cathode materials with respect to the anode is within 0.3 volt of each other.

4. The cell of claim 1, 2 or 3 wherein the first solid active material is $FeS_2$ and the second solid active material is CuO and wherein the CuO is present in an amount between about 35% and about 75% based on the weight of the active cathode materials.

5. The cell of claim 4 wherein the CuO is present in an amount between about 45% and 55% based on the weight of the active cathode materials.

6. The cell of claim 1, 2 or 3 wherein the first solid active material is $FeS_2$ and the second solid active material is $Bi_2O_3$.

7. The cell of claim 1, 2 or 3 wherein the first solid active material is $FeS_2$ and the second solid active material is $CoS_2$.

* * * * *